United States Patent Office 3,413,367
Patented Nov. 26, 1968

3,413,367
MANUFACTURE OF CARBON TETRACHLORIDE
Ulrich Kopsch, Widnes, England, assignor to Imperial Chemical Industries Limited, London, England, a corporation of Great Britain
No Drawing. Filed Jan. 16, 1964, Ser. No. 338,024
Claims priority, application Great Britain, Jan. 28, 1963, 3,439/63
8 Claims. (Cl. 260—664)

This invention relates to an improved process for the manufacture of carbon tetrachloride.

The disproportionation of phosgene to yield carbon dioxide and carbon tetrachloride may be carried out by passing the phospene at substantially normal pressure over a catalyst comprising a volatile metal chloride of tungsten or molybdenum supported on a carbon carrier such as active carbon. The conversion rates realised when using such catalysts are of the order of 20% or less and the space time yields are unsatisfactory. If the conversion rates are increased to 60% to 70% the space time yields become even poorer.

We find that when using tungsten hexachloride or molybdenum pentachloride alone (that is, in the absence of charcoal) to catalyse the disproportionation of phosgene the results are poorer still.

We have further found that the poor yields are due to formation and build-up of the corresponding metal oxychloride and that charcoal is only a very inefficient catalyst for the regeneration of the metal chloride from the oxychloride with phosgene.

The catalytic disproportionation occurs in two steps:

(1) $WCl_6 + COCl_2 \rightleftharpoons CCl_4 + WOCl_4$ (2) $WOCl_4 + COCl_2 \rightleftharpoons CO_2 + WCl_6$ The first (endothermic) reaction proceeds quickly but equilibrium is already reached when only about 5% of the metal chloride has been converted to oxychloride. The equilibrium of the second (exothermic) reaction is overwhelmingly on the right hand side of the equation. However the latter reaction is extremely slow and is therefore the rate determining reaction in the disproportionation.

We now find that very high conversion with very good space time yields are obtained in the disproportionation of phosgene to carbon tetrachloride by bringing phosgene into intimate contact at an elevated temperature with a catalyst containing molten tungsten hexachloride and/or molten molybdenum hexachloride and by arranging that the tungsten oxychloride or molybdenum oxychloride content of the catalyst is brought down to or maintained at a minimum level.

According to the present invention there is provided a process for the manufacture of carbon tetrachloride which comprises bringing phosgene into intimate contact with a molten catalyst containing tungsten hexachloride and/or molybdenum pentachloride wherein the tungsten oxychloride or molybdenum oxychloride content of the catalyst is maintained at less than 7% by weight of the tungsten or molybdenum chloride content of the catalyst and wherein the reaction temperature is maintained at at least the melting point of the catalyst but not greater than 500° C.

Preferably the oxychloride content of the catalyst is maintained below 5%. Very good results have been obtained with amounts of oxychloride corresponding to approximately 1% to 2% by weight of the molybdenum or tungsten chlorides. The initial presence of a small amount of tungsten pentachloride in the catalyst is not disadvantageous since in the course of the reaction this is converted to the hexachloride.

The present invention envisages the use of any method for maintaining the oxychloride content of the catalyst at the desired level and the process is eminently useful when carried out in a continuous manner. Thus phosgene may be passed continuously into molten tungsten hexachloride. The vaporised tungsten oxychloride and carbon tetrachloride product are distilled off and the product separated and make-up molten tungsten hexachloride is continuously added to the reaction zone.

We have found that tungtsen hexachloride and/or molybdenum pentachloride in conjunction with aluminium chloride and/or iron chloride is highly effective in maintaining the oxychloride content of the catalyst at the desired level. The aluminium and ferric chlorides catalyse the aforementioned reaction (2). The result is that the oxychloride formed in reaction (1) very rapidly reacts with phosgene to give carbon dioxide and tungsten hexachloride whicch is available once again for conversion of phosgene to carbon tetrachloride.

According to a preferred method of carrying out the invention carbon tetrachloride is manufactured by bringing phosgene into intimate contact with a molten metal chloride which is available once again for conversion or molybdenum pentachloride together with aluminium and/or iron chloride. Such a process is extremely effective and provides for in situ regeneration of the catalyst. It is eminently useful when carried out in a continuous manner, by condensing the vaporised catalyst from the exit gases and returning it to the reactor. According to one suitable means of carrying out this procedure pressurised phosgene is introduced through a nozzle at the bottom of a riser pipe placed in a pressure column. The lower part of the latter serves as a reservoir for molten catalyst. The resulting gas-liquid mixture is lifted in the riser pipe to the top of the column and is passed in concurrent downward flow through the upper part of the column which is packed with an inert material such as nickel scrap. The exit gas is cooled before being expanded and the condensed molten metal chloride is returned to the reservoir of catalyst in the pressure column. Carbon tetrachloride is recovered from the process gas and separated by fractional distillation.

Again in another method of carrying out the invention phosgene may be passed continuously into molten tungsten hexachloride and the oxychloride which is distilled off from what is in effect a first reaction stage is reacted with phosgene in the presence of aluminium or ferric chloride in a second reaction stage to regenerate the tungsten hexachloride. Aluminium chloride sublimed off with tungsten hexachloride in the second reaction stage is recycled to the second stage and the tungsten hexachloride is fed back to the first stage. As carbon dioxide is essentially the only gaseous by-product evolved in the second stage the requirement of fractionation to separate the components of a mixed gaseous product of carbon tetrachloride and carbon dioxide is eliminated.

It is also possible in the initial stages of the process to start with a catalyst consisting of the oxychloride of tungsten or molybdenum or to start with tungsten hexachloride or molybdenum pentachloride containing considerably more than 7% by weight of the oxychloride. However it is necessary according to the process of the present invention to bring down and maintain the oxychloride content below 7% by weight of the catalyst. Suitably this is done by incorporating aluminium chloride or ferric chloride in the catalyst and bringing phosgene into contact with the molten catalyst. This quickly brings about in situ regeneration of the catalyst with the advantage of high conversion and high space time yields of the carbon tetrachloride product.

Preferred temperatures are in the range 250° C. to 450° C. In particular very good results are obtained in the range 275° C. to 325° C., for example, 300° C. when using a catalyst consisting of tungsten hexachloride and ferric chloride. The operation at such low temperatures leads to higher conversion rates owing to the more favourable equilibrium of disproportionation, reduces corrosion problems and reduces volatilisation of catalyst and hence the amount of catalyst to be recovered.

To minimise danger of solid deposits forming in the catalyst during operation of the process catalyst mixtures of approximately eutectic composition may be chosen. For instance while $WCl_6$ melts at 280° C. and $MoCl_5$ melts at 194° C. the eutectic mixture consisting of 52 mole percent $MoCl_5$ and 48% $WCl_6$ melts at 159° C. Again while $WCl_6$ melts at 280° C. and $FeCl_6$ melts at 303° C. a catalyst consisting of the eutectic mixture melts at 224° C. Tertiary or quaternary systems can also be used which can include small amounts of salts such as potassium chloride to lower the melting point of the catalyst mixtures still further.

A very useful catalyst is one consisting of tungsten hexachloride and/or molybdenum pentachloride together with iron chloride. Iron based catalysts have the advantage over aluminium based catalysts of lower vapour pressure so that less of the volatilised catalyst has to be recovered. With an iron based catalyst operating at 300° C. the vapour pressure of ferric chloride is below ½ atmosphere. Also when operating at relatively low pressures, for instances 5 atmospheres less than 10% of the reaction gas consists of ferric chloride which has to be recovered. Thus the need to recover volatilised catalyst is so reduced that it is feasible to disproportionate phosgene at an operating pressure of 5 atmospheres or less.

The following example illustrates but does not limit the invention.

Example

The general manner of carrying out this example was as follows: Carius tubes having a volume of 12 ml. to 31 ml. were charged under argon with the metal chlorides and then evacuated. Phosgene was condensed in the tube which was then sealed off and reweighed. The tube was then heated in a furnace over a period up to the desired temperature after which period analysis showed only an insignificant amount of reaction occurred. The tube was then agitated vigorously for a period of 2 mins. wherein reaction ensued and was assumed to be complete. The reaction tube was withdrawn, cooled by liquid air, opened in a dry box under helium and attached to a vacuum apparatus. The helium was pumped off and the reaction products were distilled from the catalyst, condensed and analysed by gas chromatography. It was thus possible with these runs to determine the space time yields with a fair degree of accuracy.

Other runs were carried out in which the tube was heated while shaking in the furnace for a period of 30 mins. It was likely that the time required to achieve the desired temperature was a minor proportion of the 30 mins. period so that the time of shaking was more than that required to ensure substantially complete reaction. Accordingly the space time yields for the effective period while undoubtedly high were not strictly determinable. The conversion figures are however given and the results are tabulated below:

| Catalyst | Mole ratio W or Mo, $COCl_2$ | Mole ratio $Fe_2Cl_6$ or $Al_2Cl_6$, $COCl_2$ | Temp., ° C. | Partial pressure ($COCl_2$) ats. | Contact time, mins. | Conv. to $CCl_4$, percent | Yield g. $CCl_4$/hr./l Reactor |
|---|---|---|---|---|---|---|---|
| $WCl_6/Fe_2Cl_6$ | 1.22 | 1.18 | 300 | 2.55 | 30 | 90.1 | |
| $WCl_6/Fe_2Cl_6$ | 0.61 | 0.63 | 400 | 20 | 2 | 86.6 | 524 |
| $WCl_6/FeCl_6$ | 0.792 | 0.383 | 300 | 13 | 30 | 92.4 | |
| $WCl_6/Fe_2Cl_6$ | 0.79 | 0.81 | 300 | 14 | 2 | 80.1 | 586 |
| $WCl_6/WOCl_4/Fe_2Cl_6$ | 0.98 | 0.47 | 300 | 11.3 | 2 | 84.0 | 478 |
| $WCl_6/Al_2Cl_6$ | 0.665 | 0.32 | 400 | 15 | 30 | 84.9 | |
| $WCl_6/Al_2Cl_6$ | 0.323 | 0.483 | 250 | 10 | 30 | 86.0 | |
| $WOCl_4/Al_2Cl_6$ | 0.55 | 0.5 | 300 | 13 | 30 | 83.6 | |
| $WCl_6/WOCl_4/Al_2Cl_6$ | 1.11 | 0.705 | 300 | 11.3 | 2 | 89 | 472 |
| $MoCl_5/FeCl_6$ | 1.49 | 0.59 | 400 | 18 | 30 | 86.7 | |
| $MoCl_5/Al_2Cl_6$ | 0.661 | 0.284 | 400 | 21 | 2 | 51.2 | 422 |

In the 5th and 9th runs the catalyst initially contained 8.2% w./w. and 15.8% w./w. of the oxychloride. At the end of these runs the catalysts contained only 1% to 2% w./w. of $WOCl_4$; good space yields were obtained by regeneration of the catalyst in situ. In Run 8 the conversion relates to the phosgene available for disproportionation (42.8% of the total phosgene having been used for regeneration). At the end of Run 8 the catalyst contained 1% to 2% w./w. of $WOCl_4$.

Comparison

By way of comparison the procedure was repeated using catalysts consisting only of $WCl_6$, $WOCl_4$, $WOCl_4/CLl_6$, $MoCl_5$, $Fe_2Cl_6$ and $Al_2Cl_6$.

| Catalyst | Mole ratio W or Mo, $COCl_2$ | Mole ratio $Fe_2Cl_6$ or $Al_2Cl_6$, $COCl_2$ | Temp., ° C. | Partial pressure ($COCl_2$), ats. | Contact time, mins. | Conv. to $CCl_4$, percent | Yield g $CCl_4$/hr./l reactor |
|---|---|---|---|---|---|---|---|
| $WCl_6$ | 0.5 | | 400 | 9.4 | 30 | 14.0 | |
| $WCl_6$ | 4.43 | | 400 | 9.4 | 30 | 39.1 | |
| $WCl_6$ | 0.642 | | 290 | 20 | 2 | 1.1 | 11 |
| $WOCl_4$ | 0.287 | | 390 | 9.5 | 30 | | |
| $WOCl_4/WCl_6$ | 1.3 | | 300 | 11.5 | 2 | 2.4 | |
| $MoCl_5$ | 0.838 | | 300 | 11 | 2 | 1.2 | |
| $Fe_2Cl_6$ | | 0.652 | 400 | 22 | 2 | 33.2 | 310 |
| $Fe_2Cl_6$ | | 0.608 | 290 | 19½ | 2 | 3.6 | 32 |
| $Al_2Cl_6$ | | 0.59 | 400 | 15 | 30 | 8.5 | |
| $Al_2Cl_6$ | | 0.622 | 300 | 14 | 2 | 1.6 | 11 |

In Run 2 of this table the wt. percent $WOCl_4$ left in the catalyst at the end of the run was 8.3. In Run 4 the tungsten oxychloride catalyst gave no $CCl_4$. In Run 5 with a catalyst containing initially about 60% $WOCl_4$ and 40% $WCl_6$ the yields were very poor; the $WOCl_4$ content of the catalyst at the end of this run still contained about 54% $WOCl_4$. A comparison of the two tables show that when using a combination of tungsten or molybdenum chlorides with iron or aluminium chloride a surprisingly enhanced effect is realised in respect of greater conversion and increased space time yields.

What I claim is:

1. A process for the manufacture of carbon tetrachloride which comprises bringing phosgene into intimate contact in a reactor with an unsupported catalyst at a temperature above the melting point of the catalyst, but not greater than 500° C. and at pressure above atmospheric pressure, said catalyst containing a chloride selected from the group consisting of tungsten hexachloride and molybdenum pentachloride and mixtures thereof, and where the catalyst further contains an oxychloride selected from the group consisting of tungsten oxychloride and molybdenum oxychloride and mixtures thereof, and where the catalyst further contains a chloride of a metal selected from the group consisting of iron and aluminium, whereby the oxychloride content of the catalyst is maintained at less than 7% by weight of the chloride content of the catalyst.

2. A process according to claim 1 wherein at the initial stage of the process the catalyst contains more than 7% of oxychloride, and the oxychloride content of the catalyst is reduced to and maintained at a desired content below 7% by contacting the catalyst with phosgene.

3. A process according to claim 1 wherein the said chloride of a metal is iron chloride.

4. A process as claimed in claim 1 wherein the said oxychloride content of the catalyst is maintained at less than 5% by weight of the said chloride content of the catalyst.

5. A process as claimed in claim 1 wherein the said oxychloride content of the catalyst is maintained in the approximate range 1% to 2% by weight of the said chloride content of the catalyst.

6. A process as claimed in claim 1 carried out in a continuous manner wherein the exit gases from the refractor containing catalyst are condensed and the molten catalyst is returned to the reactor.

7. A process according to claim 1 in which a temperature in the range 250° C. to 400° C. is employed.

8. A process as claimed in claim 1 in which the catalyst consists of tungsten hexachloride and iron chloride, said catalyst being heated to a temperature in the range of 275° C. to 324° C.

References Cited

UNITED STATES PATENTS

| 2,892,875 | 6/1959 | Kung et al. | 260—664 |
| 3,083,241 | 3/1963 | Glemser | 260—664 |
| 3,069,481 | 12/1961 | Hazeldine et al. | 260—664 |

FOREIGN PATENTS

| 874,552 | 8/1961 | Great Britain. |
| 1,335,178 | 7/1963 | France. |

LEON ZITVER, *Primary Examiner.*

T. G. DILLAHUNTY, *Assistant Examiner.*